United States Patent Office 2,789,886
Patented Apr. 23, 1957

2,789,886

HEAT EXCHANGE PROCESS

Philip B. Kraus, Landenberg, Pa., assignor to E. I. du Pont de Nemours and Company, Wilmington, Del., a corporation of Delaware No Drawing. Application March 3, 1954,
Serial No. 413,963

5 Claims. (Cl. 23—202)

This invention relates to methods for promoting heat exchange relationship, and especially to an improved method of transferring heat between a gas-conveyed solids mixture and a heat interchange surface. More particularly, it relates to an improved method of maintaining a scrubbed heat transfer surface in a system for transferring heat to or from a gas-conveyed pulverulent solids mixture without contaminating said solid. Still more particularly, it relates to an improved process for cooling a compactable, pulverulent metal oxide and corrosive gas mixtures thereof. It also relates to an improved process for producing pigmentary titanium dioxide by the vapor phase oxidation of a titanium halide such as the tetrachloride, avoiding contamination of the pigmentary titanium dioxide product during the cooling of a high temperature reaction product mixture containing said pigmentary product.

In the vapor phase oxidation of titanium tetrachloride to produce titanium dioxide in finely divided form, preheated titanium tetrachloride vapor and preheated moisture-containing oxygen or oxygen-containing gas are continuously and simultaneously charged into a reaction zone maintained at a temperature within the range of about 800° C. to 1400° C. In order to cool rapidly the resulting reaction product and reaction by-product mixture (consisting essentially of finely divided titanium dioxide and gaseous chlorine) and thereby control the particle size of the titanium dioxide pigmentary product by preventing further particle growth from taking place, a tremendous amount of cooling must be effected within a period of a very few seconds. Various methods for quick-quenching such reaction products have been proposed, including, for example, those described in U. S. Patents Nos. 2,508,271 and 2,508,272. These methods are most successful for the initial quenching, to about 200–300° C., below the temperature of the reaction zone. In order that the total volume of gases handled will not be too great for economic equipment size, other or supplementary methods of cooling are required. These include conventional type heat interchangers, such as tubular coolers, employing gaseous or liquid coolants for passage in indirect heat exchange relationship with the gaseous suspension under treatment. Collection of pigmentary dust on the heat transfer surface of the exchanger and subsequent compacting thereof to form scale-like build-up on such surface, especially at or near bends within a tubular form of interchanger, materially decreases heat transfer and causes the emerging effluent gas to be exited from the cooler at a higher temperature than that desired. This proves not only inefficient, but will actually completely stop the cooling operation due to apparatus clogging or because gas-solids separation equipment usually contains some heat-sensitive elements, such as for example dust-collector bags, which have definite maximum operating temperatures, especially in corrosive gas systems. Extension of the tubular cooler and recourse to similar corrective measures lead only to further economic penalties, and to loss of the desired rapid cooling rate. Finely divided titanium dioxide pigments and other pulverulent metal oxides are particularly prone to such scale building action when newly formed and when at relatively high temperatures. As high linear gas velocities are utilized within the vapor phase reactor and the cooling conduit, addition of inert foreign abrasive material larger in particle size than the pigmentary material can under some circumstances be satisfactorily utilized to eliminate such scale formation. However, where a high purity type of product is desired, the addition of such relatively inert scrubbing agents (sand, carborundum, mullite, etc.) cannot be tolerated because an undesired, residual quantity of contaminant remains in the pigment when any economical and practical solid-solid separation process is resorted to. Such residual contamination renders the pigmentary titanium dioxide more difficult to grind to required pigment fineness, a characteristic which reflects itself in poor film fineness and gloss when attempts are made to employ the pigment in paints or enamels. Furthermore, these contaminating materials have an adverse effect upon pigment color, particularly in the case of white pigments such as titanium dioxide.

It is among the objects of this invention to overcome these and other disadvantages in prior processes for cooling or heating gas-conveyed, pulverulent, compactable solids, particularly in systems where the gases are of a highly corrosive nature and where a high purity pulverulent product is required, and to provide novel and useful methods for attaining such objects. Further, particular objects are: to provide an improved process of cooling a compactable, pulverulent metal oxide in the presence of a corrosive gas phase without contaminating said oxide product with difficultly separable scrubbing or cooling solids; to effect such scrubbing and cooling without recourse to a contaminating solid material which must subsequently be separated from the metal oxide treated; to provide a novel process for cooling a reaction product mixture from the vapor phase oxidation of titanium tetrachloride (containing newly formed $TiO_2$ pigmentary particles and by-product gas mixture containing chlorine) within a tubular heat exchange cooler while effectively maintaining the inner heat exchange surface of said cooler free of oxide scale build-up, especially of compacted pigmentary solids, and avoiding product contamination due to the presence and use of foreign scrubbing materials; and to provide a novel and improved process for producing and recovering pigmentary titanium dioxide in relatively pure state. Other objects and advantages of the invention will be evident from the ensuing description of the invention.

These and other objects are accomplished in this invention which comprises mixing with a stream of hot, gaseous suspended pulverulent solids being charged through a cooling conduit for indirect heat exchange relationship with the cooling surfaces of said conduit an effective amount of particulate, inert, scrubbing solids which are sublimable below the ambient temperature range of said stream within said conduit and substantially completely vaporize during their passage through said conduit with said stream, and recovering the cooled, uncontaminated pulverulent solids after their discharge from said conduit.

More specifically, the invention comprises continuously charging a minor amount of particulate solid carbon dioxide into a hot stream of the gaseous suspended reaction products resulting from the vapor phase oxidation of a metal halide with an oxygen-containing gas, passing the resulting mixture through a tubular, externally cooled heat exchanger to remove heat from said mixture by indirect exchange, substantially completely vaporizing said carbon dioxide during passage through said conduit, and recovering the uncontaminated quenched and cooled metal oxide which results.

In one preferred embodiment, the invention comprises continuously passing for reaction a preheated vaporized stream of titanium tetrachloride and a preheated stream of oxygen-containing gas carrying a controlled, minor amount of water vapor, into a closed, vapor phase reactor maintained at a temperature within the range of 800° C. to 1400° C., charging the resulting reaction product of pigmentary titanium dioxide and reaction by-product gases mixture from said reactor into a tubular form of externally cooled, indirect heat exchanger together with from about 1–10 parts by weight of particulate solid carbon dioxide per 100 parts by weight of pigmentary titanium dioxide present in said reaction products to maintain the heat transfer surfaces of said exchanger free of compacted pigmentary dust, during passage of said reaction product mixture through said exchanger cooling said mixture to a temperature within the range of about 25–150° C., and substantially completely vaporizing said added carbon dioxide, and recovering the resulting cooled, uncontaminated pigmentary titanium dioxide which results.

In description, one preferred embodiment of the invention will be referred to. Thus, in accordance with the procedures contemplated in U. S. Patent 2,559,638, a stream of vaporized, pure titanium tetrachloride containing about one part by weight of aluminum trichloride is heated to about 900° C. and passed continuously into a suitable vapor phase reactor maintained at from 900–1200° C., and preferably at about 1000° C. Within said reactor it is reacted with a stream of air heated to about 1200° C., in slight stoichiometric excess, containing from about .1%–10% and usually about .5% by weight of water vapor. The hot effluent reaction product mixture or suspension (at a temperature of about 1150° C.) from the reactor, containing finely divided pigmentary titanium dioxide, chlorine, nitrogen, and a small amount of hydrogen chloride, is then continuously discharged into an elongated, water-cooled, tubular, corrosion-resistant metal (aluminum, nickel, stainless steel, etc.) heat exchanger consisting of several vertical sections continuously connected in series by 180° bends. The gas-conveyed pigmentary stream is quickly cooled therein to below 600° C. and within a period of from not to exceed 5 or 10 seconds, following which the quenched product is discharged to conventional gas solids separating equipment, such as a cyclone separator. As close as possible to the point of introduction of the reaction product mixture into the cooler, a stream of particulate solid carbon dioxide is introduced into the stream of gas-conveyed solids being charged to said cooler. The carbon dioxide is charged therein as particles of about .3 to .4 of an inch in diameter and completely evaporates during its passage with the suspension to the exit end of the cooler within a period of about 20 seconds. Due to the concurrent abrading and cooling function which the solid $CO_2$ exerts, the heat transfer surface of the cooler is advantageously kept effectively free of undesired compacted titanium dioxide solids. On cessation of solid carbon dioxide addition, the temperature of the suspension will start to increase and continues to increase. Thus, an exit temperature of about 90° C. prevails during carbon dioxide addition at the rate of two pounds of carbon dioxide per hundred pounds of titanium dioxide produced. If, however, such addition is interrupted, a rapid increase of about 60° C. in exit temperature occurs within about 3–4 minutes. Upon discharge of the cooled suspension from the exchanger, the $TiO_2$ pigment is recovered from the reaction by-product gases and gaseous $CO_2$ without recourse to a necessary separatory step when solid, finely divided cooling agents, such as silica, are employed for cooling and abrading purposes.

To a clearer understanding of the invention, the following specific example is given. This is merely illustrative and not to be taken as limiting the invention.

*Example*

The products of reaction, consisting of pigmentary titanium dioxide, chlorine, oxygen, nitrogen, and a minor amount of hydrogen chloride, at a temperature of about 1200° C., resulting from the vapor phase oxidation in accordance with the procedures of U. S. Patent 2,488,439 of heated titanium tetrachloride with heated air containing a minor amount of water vapor, are continuously passed, at a rate of about 1350 lbs. of titanium dioxide per hour, from a vapor phase reactor into the inlet of an associated water-cooled tubular aluminum cooler of about the same internal diameter as the reactor. This cooler was about 1500 feet long and divided into several vertical sections of conduit connected by large-diameter 180° bends. The gas-conveyed solids travel time through said cooler was about 30 seconds. During such passage and period the gas-conveyed solids are cooled to about 90° C. Near the entrance end of said cooler, a connection is provided for directly feeding into the gas-conveyed solids stream particles of compressed solid carbon dioxide reduced to about one-half inch size and smaller. About 26 pounds per hour of such solid, particulate form of carbon dioxide is thus introduced for conveyance through the cooler as a scrubbing agent and for substantially complete evaporation prior to discharge of the gas-conveyed, cooled solids from the cold end of the cooler. Without solid carbon dioxide addition, the exit temperature of the cooler rose to 150° C. in three minutes of operation, necessitating immediate shut down of the system to protect dust filters made of material sensitive to the corrosive action of chlorine above such temperature. The discharged cooled solids-gas mixture from the operation is passed through a separating system, comprising cyclones and bag filters, to recover the pigmentary titanium dioxide product.

The solid scrubbing agent of my invention can be added either continuously or intermittently to the gas-conveyed solids within the heat exchanger. The amount used can be varied, depending on the particular scrubbing and cooling requirements of the system being utilized. Preferably, amounts ranging from about 1 to 10 percent by weight of the solid scrubbing material, based on the gas-conveyed solids being charged to the cooler, are employed, although up to about 15 percent by weight and more can be used, if desired. The scrubbing solids can be added at any convenient point in the system, but as noted are preferably added close to the point of entrance of the gas-conveyed solids to the exchanger system. Obviously, the scrubbing solids can be injected into the stream of gas-conveyed solids at multiple addition points, especially at those points adjacent to which a relatively severe oxide scale build-up occurs due to the configuration of the equipment. Such build-ups are most likely to occur at bends in the tubular system where severe impact of the gas-conveyed solids is experienced by the wall surfaces. As the exit end of the heat exchanger is approached, the particle size of any added scrubbing solids is reduced so that substantially complete vaporization of said scrubbing solids is attained before the gas-conveyed solids mixture leaves the heat exchanger system. When intermittent addition of the scrubbing solids is practiced, additions of the scrubbing solids at frequent intervals, as every minute, or two minutes, have been found to be particularly effective, the frequency depending on the allowable temperature variation of the exit gases from the heat exchange system.

The selection of sublimable solids is limited, particularly when the system involved is one including corrosive solids or corrosive gases. For example, in cooling the gas-conveyed solids from the vapor phase oxidation of metal halides (chlorides, bromides, iodides) to obtain the metal oxide in particulate form, the hot halogen gases often contain minor amounts of hydrogen halides, which create extremely corrosive gas mixtures. In such systems compounds comprised of only carbon, oxygen, nitrogen, and the halogen component of the system are particularly useful. In the system usually encountered in cooling the reaction products resulting from the vapor phase oxidation of titanium tetrachloride, sublimable compounds comprised largely of carbon, oxygen, nitrogen or chlorine, useful as scrubbing agents include solid carbon dioxide, solid hexachloroethane, and the like. Because of its very low sublimation temperature, use of carbon dioxide is preferred herein, and also because the exit temperature of the cooled products can be readily reduced to normal room or lower temperatures to still obtain pigmentary solids from the cooler uncontaminated by residual particles of hard scrubbing solids of the usual type. Furthermore, the evaporating film of carbon dioxide gas surrounding the solid carbon dioxide particles slows down the mass and heat transfer, so that effective "scrubbing life" is prolonged. Sublimable ammonia compounds also can be used, for example, ammonia carbamate, ammonium chloride, and the like.

The amount of sublimable scrubbing solids which is added into the stream of pulverulent gas-conveyed solids will vary considerably with the compactibility of the pulverulent solids in the system. For economic and other reasons, the smallest effective amount is usually used. This is particularly true in the case of such a sublimable solid as carbon dioxide, as the cost of the carbon dioxide in solid form and of the optimum particle size must be carefully considered in the economics of the process. The amount of carbon dioxide added is preferably within one-half to ten percent by weight of the pigmentary solids being conveyed by the gas phase; however, up to fifteen percent and higher may be utilized. In any case, since the solids being conveyed by a gas phase is usually small on a weight basis compared to the conveying gas, the percentage amount of scrubbing solids based on the total weight of the conveying gas and solids is considerably smaller and does not have an appreciable effect on the total amount of heat to be transferred.

The many advantages of the invention will be apparent from the foregoing description. In general, it affords a novel method of maintaining efficient heat transfer surfaces within an indirect heat exchange system for heat exchange to or from gas-conveyed pulverulent solids, and at the same time avoiding contamination of the product with the scrubbing agent. In the case of pigmentary materials, such as titanium dioxide, particularly those used for the highest quality gloss paints and enamels and other uses wherein an absolutely uniform and high degree of fineness is essential, the process of this invention not only reduces the amount of grinding necessary for final finishing of the pigment, but also provides a method of insuring the highest gloss enamel properties with very little or no grinding. This is particularly evident when improved conditions within the vapor phase oxidation reactor are attained so as to produce no hard scale-like material which could act as a scrubbing agent. Furthermore, due to the corrosiveness of the gases often encountered, particularly in the vapor phase oxidation of titanium dioxide, the addition of foreign scrubbing agents, as for example alumina, silica, and mullite, always is hazardous because of the fact that such agents usually contain minor amounts of contaminants such as oxides and other compounds of iron, chromium, vanadium, and other metals, which can be leached out of such scrubbing agents and become adsorbed within the cooler by the white pigmentary titanium dioxide and cause serious color deficiencies. Such color deficiencies may show up immediately, or may not be determinable unless the pigment product is made up into a paint or an enamel and subjected to outdoor exposure or to the high temperature used in applying baking enamels and similar coating compositions.

I claim as my invention:

1. A process for scrubbing the interior surfaces of an externally cooled cooling zone through which a hot, gas-conveyed pulverulent solids stream is passed for cooling, comprising mixing with said stream for passage through said zone a particulate inert solid which is sublimable at a temperature below the temperature range of said stream on discharge from said zone and which substantially completely vaporizes upon passage therethrough, and recovering the pulverulent solids free of said sublimable scrubbing solids.

2. A method for maintaining the internal surfaces of an externally cooled conduit substantially free of metal oxide scale deposit which comprises mixing a minor amount of particulate inert solid carbon dioxide with a hot stream of a gaseous suspension of metal oxide reaction products being charged through said conduit for quenching, during passage of the resulting mixture substantially completely vaporizing said solid carbon dioxide from said metal oxide, and recovering the uncontaminated quenched and cooled metal oxide product which results.

3. An improved process for cooling the reaction product mixture from the continuous vapor phase oxidation of a metal halide with an oxygen-containing gas, comprising passing a hot stream of said reaction product mixture through a tubular, externally cooled cooler, maintaining the heat transfer surface of said cooler substantially free of compacted metal oxide reaction product scale build-up by directly mixing with said stream a minor amount of solid particulate carbon dioxide which is inert toward said metal oxide, during passage of said stream through said cooler, cooling said reaction mixture to about room temperature and substantially completely vaporizing said particulate carbon dioxide, and recovering the finely divided metal oxide.

4. An improved process of cooling the reaction product mixture comprising pigmentary titanium dioxide and by-product chlorine and hydrogen chloride from the continuous vapor phase oxidation of a titanium tetrachloride with an oxygen-containing gas, comprising charging said mixture as a stream into a tubular, indirect heat exchange zone while at a temperature ranging from 800° C. to 1400° C., together with from one-half to ten parts by weight per hundred parts of pigmentary titanium dioxide of inert solid carbon dioxide in particulate form to maintain the internal surfaces of said zone substantially free of deposited, compacted $TiO_2$ solids, cooling said gas-conveyed stream of titanium dioxide to a temperature within the range of about 25–150° C., and substantially completely vaporizing said particulate carbon dioxide during passage of the mixture through said zone, and thereafter recovering the resulting cooled, contaminant-free pigmentary titanium dioxide.

5. An improved method for cooling the reaction product mixture resulting from the continuous vapor phase oxidation of a metal halide with an oxygen-containing gas comprising passing a stream of said reaction product mixture through a tubular, externally cooled cooling zone, maintaining the heat transfer surface of said zone substantially free of compacted metal oxide reaction product scale build-up by directly mixing with said stream a minor amount of a particulate inert solid which is sublimable at a temperature below the temperature range of said stream on discharge from said zone and becomes substantially completely vaporized during its passage therethrough, during passage of said stream through said zone cooling said reaction mixture to about room temperature, and thereafter recovering the cooled, finely divided metal oxide.

References Cited in the file of this patent

UNITED STATES PATENTS

| | | |
|---|---|---|
| 2,007,510 | Thornton | July 9, 1935 |
| 2,488,440 | Schaumann | Nov. 15, 1949 |
| 2,508,272 | Booge | May 16, 1950 |
| 2,559,638 | Krchma | July 10, 1951 |
| 2,721,626 | Rick | Oct. 25, 1955 |

OTHER REFERENCES

J. W. Mellor's: "A Comprehensive Treatise on Inorganic and Theoretical Chem.," vol. 6, 1925 ed., page 72, Longmans, Green and Co., N. Y.